United States Patent
Begorre et al.

(10) Patent No.: US 8,769,639 B2
(45) Date of Patent: Jul. 1, 2014

(54) HISTORY-BASED DOWNGRADED NETWORK IDENTIFICATION

(75) Inventors: Bill Begorre, Redmond, WA (US); Deon C. Brewis, Redmond, WA (US); Alok Sinha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1505 days.

(21) Appl. No.: 12/070,500

(22) Filed: Feb. 19, 2008

(65) Prior Publication Data

US 2009/0064299 A1 Mar. 5, 2009

Related U.S. Application Data (60) Provisional application No. 60/967,433, filed on Sep. 4, 2007.

(51) Int. Cl.
*G06F 15/16* (2006.01)
(52) U.S. Cl.
USPC ...... 726/5; 726/6; 726/12; 713/153; 713/168; 709/232
(58) Field of Classification Search
USPC .................................. 726/5, 6, 12
See application file for complete search history.

(56) References Cited

U.S. PATENT DOCUMENTS

| | | | |
|---|---|---|---|
| 6,640,302 B1 | 10/2003 | Subramaniam et al. | |
| 6,715,083 B1 | 3/2004 | Tovander | |
| 6,950,628 B1 | 9/2005 | Meier et al. | |
| 7,016,948 B1 | 3/2006 | Yildiz | |
| 7,068,999 B2 | 6/2006 | Ballai | |
| 7,174,454 B2 | 2/2007 | Roskind | |
| 7,181,530 B1 | 2/2007 | Halasz et al. | |
| 7,222,359 B2 * | 5/2007 | Freund et al. | 726/3 |
| 7,823,199 B1 * | 10/2010 | Rathi et al. | 726/22 |
| 7,885,639 B1 * | 2/2011 | Satish et al. | 455/410 |

(Continued)

FOREIGN PATENT DOCUMENTS

| | | |
|---|---|---|
| WO | WO 2005/041040 A1 | 5/2005 |
| WO | WO 2006/063118 A2 | 6/2006 |
| WO | WO 2007/061167 A1 | 5/2007 |

OTHER PUBLICATIONS

International Search Report and Written Opinion for International Application No. PCT/US2009/060876 mailed May 14, 2010.

(Continued)

*Primary Examiner* — Shewaye Gelagay
(74) *Attorney, Agent, or Firm* — Andrew Sanders; Micky Minhas (57) ABSTRACT

Some embodiments of the invention are directed to increasing security and lowering risk of attack in connecting automatically to networks by enabling client devices to verify the identity of the networks by, for example, confirming the identity of networks and network components such as wireless access points. In some embodiments, a client device may maintain a data store of characteristics of a network—including, for example, characteristics of a wireless access point or other portion of the network and/or characteristics of a connection previously established with the wireless access point and/or network. Stored characteristics may include characteristics other than those minimally necessary to identify a wireless access point and/or wireless network. The stored characteristics may be compared to known good characteristics of a network (including characteristics of a wireless access point or other portion of the wireless network) prior to connection to the network to determine whether the characteristics match.

20 Claims, 5 Drawing Sheets

(56) References Cited

U.S. PATENT DOCUMENTS

| | | |
|---|---|---|
| 2002/0007407 A1* | 1/2002 | Klein .......................... 709/225 |
| 2003/0149756 A1 | 8/2003 | Grieve et al. |
| 2004/0093398 A1 | 5/2004 | Tang et al. |
| 2004/0103310 A1 | 5/2004 | Sobel et al. |
| 2004/0210654 A1 | 10/2004 | Hrastar |
| 2005/0086510 A1 | 4/2005 | Nicodemus et al. |
| 2005/0193129 A1 | 9/2005 | Barlow |
| 2005/0257267 A1 | 11/2005 | Williams et al. |
| 2006/0018264 A1 | 1/2006 | Yamakawa |
| 2007/0066304 A1* | 3/2007 | Lee .............................. 455/436 |
| 2007/0067823 A1 | 3/2007 | Shim et al. |
| 2007/0081488 A1 | 4/2007 | Adya et al. |
| 2007/0157315 A1 | 7/2007 | Moran |
| 2007/0198663 A1 | 8/2007 | Helander |
| 2008/0163332 A1 | 7/2008 | Hanson |
| 2009/0019141 A1* | 1/2009 | Bush et al. .................... 709/223 |

OTHER PUBLICATIONS

Bahl P., et al., "Enhancing the Security of Corporate Wi-Fi Networks Using DAIR," *MobiSys*, Jun. 2006, pp. 1-14, Uppsala, Sweden, https://research.microsoft.com/~ranveer/docs/DAIR-MobiSys.pdf.

Russell, S., "Detecting and Locating Rogue Access Points," Apr. 28, 2003, http://www.ee.iastate.edu/~russell/cpre537.s06/Report-Example.pdf.

Steuer, F., et al., "Seamless Mobility Over Broadband Wireless Networks,", 5 pages, Apr. 2005, http://www.eurasip/org/content/Eusipco/IST05/papers/534.pdf.

"View Your Preferred Wireless Networks," Nov. 2007, pp. 1-2 http://windowshelp.microsoft.com/Windows/en-GB/Help/2e8b049d-7265-4ac0-a3c5-56a7c5e8cef61033.mspx.

"Wireless Wellness: Wireless LAN Security Considerations for the Healthcare Community," SANS Institute 2003, 13 pages http://www.giac.org/certified_professionals/practicals/gsec/2840.php.

\* cited by examiner

HISTORY-BASED DOWNGRADED NETWORK IDENTIFICATION

CROSS-REFERENCE TO RELATED APPLICATION(S)

This application is a non-provisional application of, and claims the benefit of, U.S. Prov. App. No. 60/967,433, filed Sep. 4, 2007, entitled "HISTORY-BASED DOWNGRADED NETWORK IDENTIFICATION". The entirety of the aforementioned application is incorporated herein by reference.

BACKGROUND OF INVENTION

Local area networks (LANs) are typically separated into two broad categories: personal/home networks and enterprise/corporate networks. These two categories may also be called, respectively, unmanaged and managed networks. In this context, a managed network may be one comprising one or more network management components such as domain controllers, AAA server (authentication, authorization, and accounting server), or other networking devices which perform network management tasks such as, for example, authentication, whereas unmanaged networks lack such components.

The two categories of LANs are similar in many respects, but may be implemented differently in their environments. For example, a home LAN typically is a wireless LAN (WLAN) that may have a single wireless access point or a handful of wireless access points, while corporate LANs may have a great number of wireless and/or access points and may be a part of or be connected to a managed network comprising network management components such as domain controllers.

Conventionally, different types of hardware may be used with the two categories of LANs. This difference may be seen, for example, in the implementation of a gateway for the networks. A gateway is a piece of network equipment which serves to connect two networks by operating as the entry/exit point for data entering or leaving a network. In a home WLAN, a single piece of equipment may act as both a wireless access point and as a gateway, while a corporate LAN may have wireless access points which are connected through a computer network to a gateway separate from the wireless access points.

Given the different types of hardware, client devices seeking to connect to a LAN may conventionally identify home LANs and corporate LANs in different ways. For example, a wireless access point for a home WLAN may be identified, for example, by a Medium Access Control (MAC) address of the gateway of the wireless access point (i.e., the Gateway MAC), whereas corporate WLANs, having a plurality of wireless access points, may be identified by a unique identifier for the network, such as a globally unique identifier (GUID) for the enterprise/managed network. In a network managed by the Windows Operating System from the Microsoft Corporation of Redmond, Wash., this GUID may be a forest GUID representing a unique value for the enterprise network and all information associated with the enterprise network, a domain GUID representing a unique value for a domain on the network with which all or a portion of the equipment on the enterprise network is associated, or any other suitable value.

Client devices may be configured to present a user with a list of nearby WLANs from which the user may select a WLAN to which to connect, or may alternatively or additionally be configured to connect to specific WLANs automatically when those WLANs are available. Wireless access points may be configured to transmit periodically in a publicly-broadcast beacon transmission a network name for the wireless access point in the form of a Service Set Identifier (SSID). A client device configured to connect automatically may be configured to examine the beacons it receives for a specified network name or SSID. If the client device finds a wireless access point meeting the specified criteria, it may connect to the wireless access point without a user's selection.

SUMMARY OF THE INVENTION

Some embodiments of the invention are directed to increasing security and lowering risk of attack in connecting automatically to networks by enabling client devices to verify the identity of the networks by, for example, confirming the identity of networks and network components such as wireless access points. In some embodiments, a client device may maintain a data store of characteristics of a network—including, for example, characteristics of a wireless access point or some other portion of the network and/or characteristics of a connection previously established with the wireless access point and/or network. The stored characteristics may include characteristics other than those minimally necessary to identify a wireless access point and/or wireless network. The stored characteristics may be compared to known good characteristics of a network (including characteristics of a wireless access point or other portion of the wireless network) prior to connection to the network to determine whether the characteristics match. If the stored characteristics match the known good characteristics of the network, then the client device may determine that the network is one to which the client device has previously connected and the client device may connect to the network. If the stored characteristics do not match the characteristics of the detected network, then the client device may determine that there is a risk that the network is not authentic (e.g., an attacker may be trying to make a network controlled by the attacker to appear to be a trusted network to which the client device has previously connected).

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that conventional methods of identifying networks and/or wireless access points suffer from significant risk of networks being spoofed to enable an attack by malicious third parties. A spoofing attack on a computer or computer network is one in which an attacker's device masquerades as a trusted device to gain illegitimate access to the computer or computer network. As an example of such an attack, for a WLAN, while users (e.g., typical users such as end users and/or special users such as administrators) may configure their client devices (e.g., computers) to automatically connect to a WLAN based on a specified SSID, conventional client devices are not capable of verifying that a wireless access point transmitting the specified SSID is the wireless access point to which the user intended to connect. A client device may therefore automatically connect to a wireless access point based on a broadcast SSID without the client device being certain that the wireless access point to which it is connecting is the wireless access point to which it intends to connect and is not, for example, an attacker's device masquerading as the intended or expected wireless access point.

An attacker may take advantage of this to gain entry to or control of a user's client device, or to obtain information from the user's client device. For example, a user of a client device may configure the client device to automatically connect to a WLAN at a nearby coffee shop when a wireless access point broadcasting the SSID of the "Coffee Shop" is in range (i.e., when the user is in the coffee shop), to automatically connect to a WLAN in the user's home when a wireless access point broadcasting the SSID of "Home" is in range (i.e., when the user is at home), etc. Both WLANs (the coffee shop WLAN and the home WLAN) may be personal/home WLANs, and thus may be identified by a Gateway MAC contained in a publicly-broadcast beacon transmission from the wireless access points. Additionally, the user may configure the client device to adapt different configuration settings, such as security settings, based on the Gateway MAC of the wireless access point to which it is connected or connecting. For example, a client device may be configured to be more "open" or more insecure (e.g., the client device may make more ports available for connection) when connected to the home network where it expects to be in a safe, private environment, and to be more "closed" or secure when connected to the coffee shop network which it expects to be a riskier, public environment.

Applicants have appreciated that conventional systems make client devices susceptible to attack. For example, an attacker may monitor the beacon transmission of a public (e.g., the coffee shop's) wireless access point and store the public wireless access point's SSID, and then may follow the user home and monitor the beacon transmission of the user's home wireless access point and store the home wireless access point's Gateway MAC. The attacker may then establish a WLAN near the user's home using a wireless access point transmitting in its beacon transmission the SSID of the coffee shop WLAN but with the Gateway MAC of the user's home WLAN. The attacker may then, using known techniques, remotely disconnect the user's client device from the user's home WLAN. After disconnecting, the client device may scan for beacon transmissions from wireless access points within range. Because the client device has been previously configured to connect automatically to the coffee shop WLAN when the coffee shop WLAN is within range, upon recognizing the SSID of the coffee shop ("Coffee Shop") being broadcast by the attacker's wireless access point, the client device may automatically connect to the attacker's WLAN. This is because, using conventional methods, the client device is only capable of recognizing the coffee shop WLAN based on the SSID of the coffee shop wireless access point, and this SSID is being broadcast by the attacker's wireless access point. The client device may adapt configuration settings for the new connection based on the Gateway MAC presented by the attacker's wireless access point, which the client device will recognize as the Gateway MAC of the home wireless access point. Thus, the client device may adopt relatively low security levels (as it has been previously configured to do when it recognizes the Gateway MAC of the home wireless access point) than when it is connected to a public access point, and thus become more "open" and susceptible to the attacker.

Applicants have appreciated that conventional methods of automatically connecting to trusted WLANS (e.g., home and corporate WLANs) leave client devices susceptible to spoofing attacks, an example of which is described above. Applicants have further appreciated that the security of automatic connection to WLANs may be improved and the risk of attack lessened if client devices were capable of confirming the identity of wireless access points and/or WLANs before the client devices automatically connect to them.

The characteristics conventionally used to identify a wireless access point and/or a WLAN are a Gateway MAC for a personal/home WLAN and a unique identifier (e.g., a forest or domain GUID) for an enterprise/corporate WLAN. These characteristics may be considered to be those minimally necessary to identify a wireless access point or WLAN. Applicants have appreciated, however, that security may be improved and the risk of attacks such as the one described above may be lowered by examining additional or different information (e.g., more characteristics of a wireless access point, as well as characteristics of the WLAN of a wireless access point and/or one or more connections previously established with a wireless access point) to identify a WLAN or wireless access point. Applicants have further appreciated that making more information available to client devices for use in an identity confirmation process for wireless access points may improve the ability of client devices to confirm the identity of wireless access points.

Accordingly, in one embodiment of the invention, characteristics of wireless access points, WLANs, and/or previous connections to wireless access points and LANs may be stored on a client device to aid in confirming the identity of wireless access points and/or LANs to which client device attempts to connect by enabling the devices to compare characteristics of a wireless access point to previous characteristics of the wireless access point to ensure consistency.

Additionally, Applicants have appreciated that security risks such as those discussed above are not limited to WLANs, and that other types of wireless networks such as Wireless Wide Area Networks (WWANs), Wireless Personal Area Networks (WPANs), wired networks, and other network types are susceptible to similar or other types of attack. Therefore, security of other types of networks may be improved and risk of attacks such as the one described above may be lowered by enabling client devices to confirm the identity of networks (both wired and wireless) and networking equipment (such as wireless access points) prior to the client devices connecting to them.

In view of the foregoing, some embodiments of the invention are directed to increasing security and lowering risk of attack in connecting automatically to networks by enabling client devices to confirm the identity of the networks (e.g., by confirming the identity of wireless access points or other network components). In some embodiments, a client device may maintain a data store of information regarding a network including, for example, characteristics of a wireless access point or other network components and/or characteristics of a connection previously established with the wireless access point or network. The stored information may be more information than is minimally necessary to identify a wireless access point and/or wireless network. The stored information may be compared to characteristics of a network (including, for example, characteristics of a wireless access point or wireless network) prior to connection to the network to determine whether the network is an authentic network. An authentic network is one for which the identity has been verified by comparing characteristics of the network to characteristics of an authentic network stored in a data store. As a result of the comparison, the client device may determine (1) whether the network is a network to which the client device has previously connected, and, if so, whether the characteristics are consistent with prior connections, so that if there is any discrepancy, suspicions of an attack may be raised; (2) whether the detected network is one to which the client device has never previously connected; and/or (3) any other suitable determination.

Applicants have further appreciated that the benefits of allowing a client device to confirm the identity of a network to which it connects are not constrained to wireless networks. Thus, although some embodiments of the invention discussed below are described as operating in conjunction with wireless networks, it should be appreciated that all embodiments of the invention are not limited to operating with wireless networks, as some embodiments may be implemented with networks to which the client connects via a wired connection.

It should be appreciated that the processes discussed below—such as process 100 of FIG. 1, process 200 of FIG. 2, and process 300 of FIG. 3—may be implemented by any suitable client device capable of communicating over a computer network. As will be discussed in further detail below, a client device may be any computing device capable of communicating over a computer network, such as a laptop personal computer, a personal digital assistant (PDA), or any other suitable device.

Figure 1:
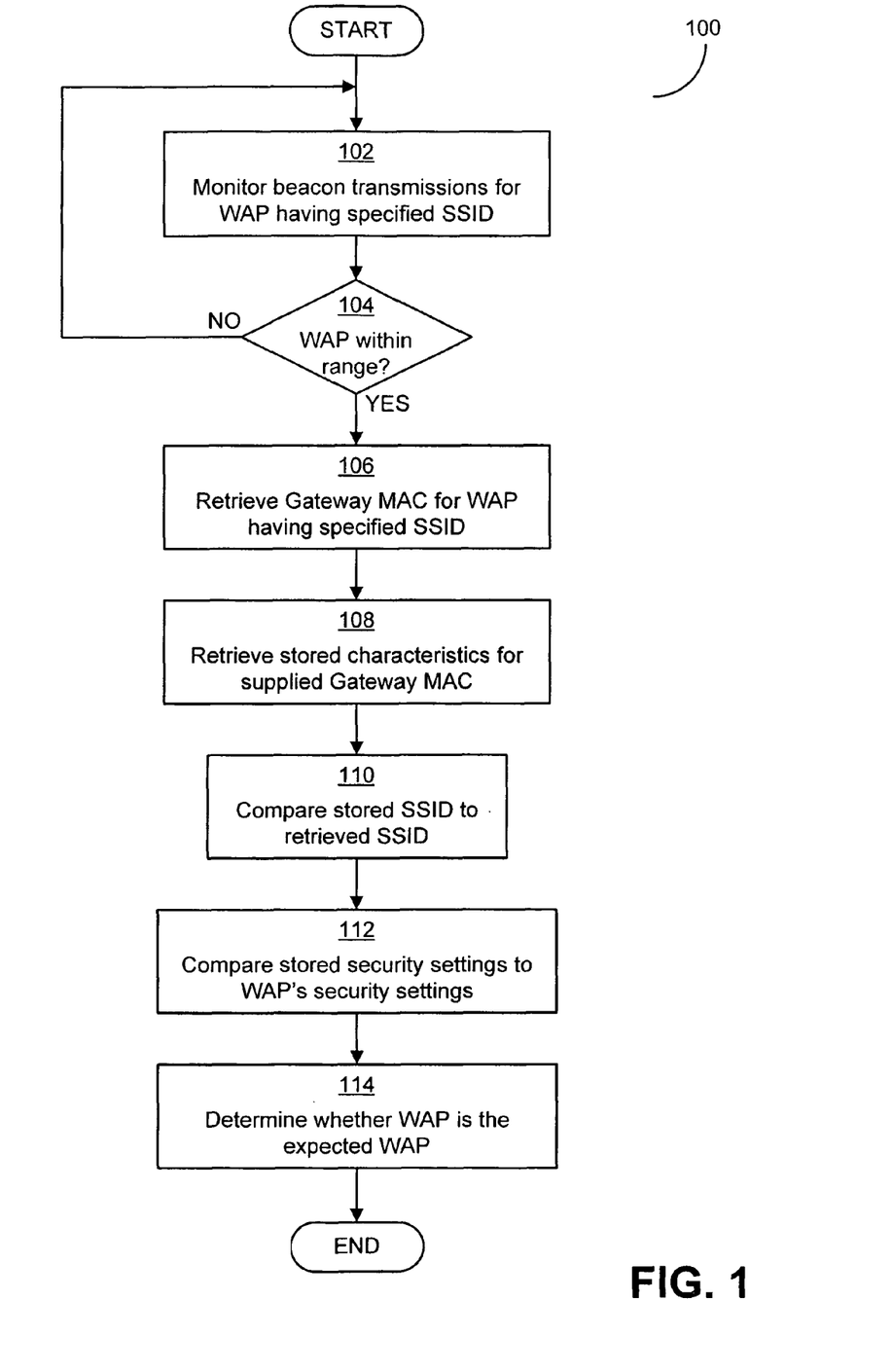
FIG. 1 is a flowchart of an illustrative process of identifying a wireless access point of an unmanaged LAN which may be implemented in accordance with one embodiment of the invention.
Figure 2:
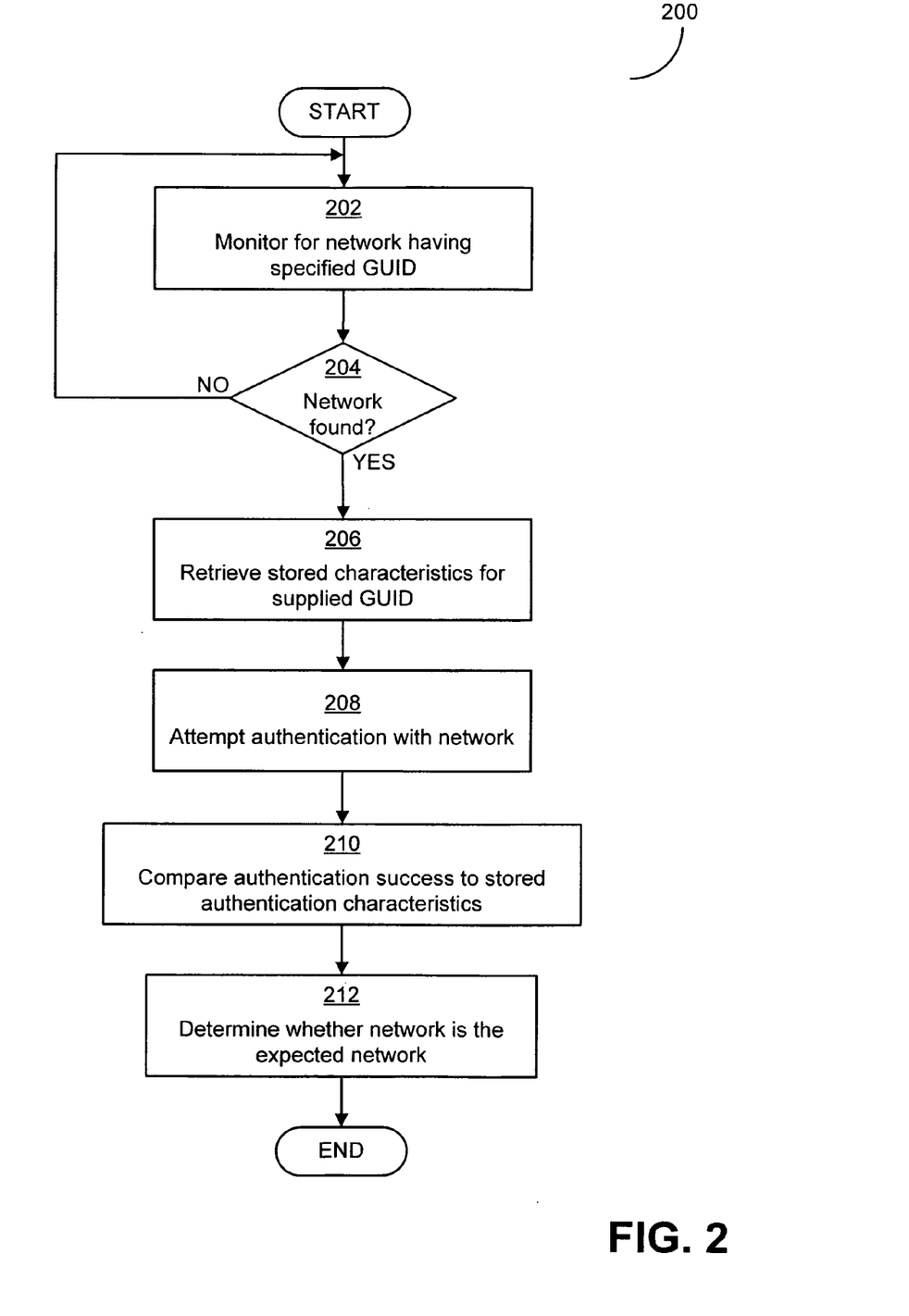
FIG. 2 is a flowchart of an illustrative process of identifying a wireless access point of a managed LAN which may be implemented in accordance with one embodiment of the invention.

FIGS. 1 and 2 show exemplary processes for confirming the identity of a wireless access point and/or LANs that may be implemented in accordance with some embodiments of the invention. FIG. 1 shows a process 100 which may be implemented with an unmanaged network such as a personal/home WLAN and FIG. 2 shows a process 200 which may be implemented with a managed network such as an enterprise/corporate LAN. It should be appreciated that these processes are merely illustrative and that embodiments of the invention which implement processes for confirming the identity of networks and/or network components such as wireless access points may implement any suitable process or processes. Thus, embodiments of the invention are not limited to implementing these specific processes.

In some embodiments of the invention, processes 100 and 200 may be executed by a client device as part of a process of searching for a LAN (e.g., a WLAN) to which to connect. In some embodiments, a client device executing process 100 may be configured by a user (e.g., a typical user such as an end user or a special user such as an administrator) to search for available WLANs and may be further configured to search for one or more specific WLANs to which to connect before connecting to other WLANs. The one or more specific WLANs may be, for example, WLANs which the user or client device has identified as preferred WLANs. In some embodiments of the invention, a client device may maintain a data store of information about specific networks and/or access points, such as those which have been identified as preferred networks/access points. A client device maintaining such a data store may then search for and connect to specified WLANs listed in the data store before searching for or connecting to other, non-preferred WLANs.

Each of the information stored in the data store may comprise any suitable information about the networks/access points, such as characteristics of the networks or access points, and may depend on the type of network or access point. For example, the data store may store information such as an SSID, Gateway MAC, and/or other information for a home/personal WLAN, but may instead store a GUID (e.g., forest GUID) and/or other information for a corporate/enterprise WLAN. Exemplary types of information that may be stored are discussed in greater detail below, but it should be appreciated that any type or types of information regarding a network or network device (e.g., wireless access point) may be stored, as embodiments of the invention are not limited in this respect.

Specific LANs, such as preferred WLANs, may be identified in any suitable manner. For example, in some embodiments of the invention, a user may specify a preferred WLAN by entering into the client device information regarding the WLAN such that the information may be stored in the data store. Additionally or alternatively, a user may specify that a WLAN to which the client device is connected, or a WLAN within range of the client device, is a preferred WLAN, and the client device may retrieve information regarding the WLAN from the network and/or access point and store the information in the data store. As a further alternative, a client device may store in the data store information regarding a network or access point when the client device connects to the network or access point, such that each network or access point to which the client device has previously connected may be a specified WLAN or preferred WLAN. It should be appreciated, however, that these techniques are merely exemplary, and that embodiments of the invention are not limited to any particular technique or techniques for specifying preferred networks, including preferred WLANs.

Processes 100 and 200 may be initiated in any suitable manner for any suitable reason. For example, the process 100 may be initiated by a user actively seeking to connect to a WLAN, or by the client device in response to an automated or scheduled action such as, for example, a scheduled request for data such as pulling electronic mail from a mail server, as part of a power-on process of the client device, as part of a reconnection process when the client device is leaving the range of a wireless access point to which the client device is connected, or some other action. Alternatively, process 100 may be a continuous, automated process such as a process executed by the client device in which the client device searches for preferred WLANs to which to connect when not connected to any WLAN and/or when connected to another, non-preferred WLAN.

Referring now to FIG. 1, the illustrative process 100 begins in block 102, wherein a client device receives beacon transmissions from nearby wireless access points (WAPs) and monitors the beacon transmissions for a wireless access point having a specified SSID or one of a list of specified SSIDs (for example, one or more SSIDs of wireless access points of preferred WLANs). As discussed above, wireless access points may be configured to transmit periodically a beacon transmission comprising information about the wireless access point and/or the WLAN of which it is a part, and this beacon transmission may comprise network characteristics such as an SSID and a Gateway MAC of the wireless access point.

If, in block 104, it is determined that a wireless access point having a specified SSID is within range, then in block 106 the Gateway MAC of the wireless access point is retrieved from the wireless access point. The Gateway MAC may be retrieved, for example, from the beacon transmission of the wireless access point or may be requested from the wireless access point.

When it is determined in block 104 that no wireless access point having a specified SSID is within range, then process 100 may loop back to block 102 and continue monitoring beacon transmissions of wireless access points until one with a specified SSID is detected. In some alternative embodiments of the invention, instead of looping back to block 102, the process 100 may end if no wireless access point having a specified SSID is within range, and the client device may then search for non-preferred WLANs to which to connect, may present to the user any suitable indication that no preferred WLANs were found, or may take any other suitable action.

In block 108, based on the Gateway MAC of the wireless access point retrieved in block 106, stored information regarding the detected wireless access point is retrieved. The stored information may comprise characteristics of the WLAN or wireless access point, and may be retrieved from a computer-readable storage medium of the client device or from any other suitable storage medium. As discussed above, the stored characteristics may be, for example, characteristics of a previous connection to the wireless access point and/or may be pre-provisioned expected characteristics of the wireless access point provided by, for example, a user of the client device or a network administrator of the WLAN of the wireless access point. The stored characteristics may comprise any suitable characteristics of the wireless access point or a connection to the wireless access point, such as the SSID of the wireless access point, the Gateway MAC of the wireless access point, security settings implemented by the wireless access point (e.g., whether security is enabled and/or what type of security has been implemented), etc.

In block 110, the SSID of the stored characteristics (e.g., the SSID of the wireless access point from a previous connection) is compared to the SSID of the detected wireless access point as contained in the beacon transmission and, in block 112, the security settings of the detected wireless access point are compared to the stored security settings of the wireless access point. Based at least in part on the comparisons in blocks 110 and 112, the process 100 determines, in block 114, whether the wireless access point is the wireless access point it purports to be (i.e., where it is the wireless access point of the preferred WLAN, to which the client device was previously connected and from which the stored characteristics were retrieved), or whether it is a different wireless access point that has adopted the preferred wireless access point's SSID.

The determination in block 114 may be made in any suitable manner. For example, using the stored characteristics, the process 100 may compare a detected wireless access point's SSID and Gateway MAC to a stored SSID and Gateway MAC. If the detected pair (i.e., the detected SSID and Gateway MAC) matches the stored pair (i.e., the stored SSID and Gateway MAC), the process 100 may determine in block 114 that the detected wireless access point is the preferred wireless access point. Conversely, if the detected pair does not match the stored pair (e.g., the detected Gateway MAC is in the data store, but stored with a different SSID than the detected SSID), then the process 100 may determine that it cannot verify that the detected wireless access point is the expected wireless access point. If the process 100 cannot verify the identity of the wireless access point, then in some embodiments of the invention, in block 114 the process 100 may determine that the detected wireless access point is a different wireless access point, and/or may determine that the detected wireless access point is being used in an attempted attack.

For example, using the exemplary attack scenario described above, when seeking to connect to the home WLAN the client device may compare characteristics of the user's home WLAN (the authentic WLAN) such as the SSID and the Gateway MAC to stored characteristics. Before the attack begins, the client device, upon performing this comparison, could determine that the pair of SSID and Gateway MAC retrieved from the home WLAN match the stored pair of characteristics. Thus, the client device could determine that the access point of the home WLAN is the preferred wireless access point. After the attacker forces the client device to disconnect from the home WLAN, the client device may detect the attacker's device which is broadcasting the SSID of the coffee shop WLAN but with the Gateway MAC of the home WLAN. The client device, when attempting to connect to the attacker's device, may detect that, according to the information in the data store, the SSID of the coffee shop was previously associated with a different Gateway MAC, and/or may determine that the Gateway MAC was previously associated with a different SSID. Because the characteristics of the detected WLAN do not match the characteristics stored in the data store, the client device may conclude that the attacker's device is not a preferred WLAN (e.g., may not conclude that the attacker's device is the coffee shop's wireless access point). It should be appreciated that this example is merely illustrative, and that embodiments of the invention may operate with any suitable network, wired or wireless, and may store and compare any suitable information regarding networks which may be used to verify the identity of a network.

In some embodiments of the invention, before making a final determination regarding whether the identity of a network or network element such as a wireless access point can be verified (e.g., before concluding that the client device should or should not connect to the wireless access point), the client device may examine further characteristics of the detected wireless access point. Examining further characteristics of the detected wireless access point may be advantageous in some situations, as it permits for minor variations in characteristics of a WLAN or wireless access point. For example, it is common, especially in home networks, for an administrator of a WLAN to change periodically certain properties such as an SSID of a WLAN. By examining further characteristics before making a final determination, and including a result of that examination in the determination, an administrator of a WLAN could change the SSID of a wireless access point without the wireless access point being deemed suspicious or being deemed a new wireless access point by the process 100. Thus, even if a mismatch is detected in some information, the identity of a network may still be verified based on additional information. Alternatively, while in some embodiments certain types of information may be considered to be "additional types of information," in other embodiments those types of information may be the first to be examined instead of the types discussed above (i.e., the SSID and Gateway MAC). For example, because it is known that an SSID of a network may change often, a process may not initially examine the SSID of the network, but may instead examine any of the exemplary types of information discussed below.

It should be appreciated, however, that some embodiments of the invention may not examine further information regarding a wireless access point (e.g., characteristics of the wireless access point) when a mismatch of any information is detected, as embodiments of the invention are not limited to performing any specific examination steps in performing a verification process.

Embodiments of the invention which do examine this additional information may examine any suitable information regarding a wireless access point and/or a WLAN, including any additional characteristics of the wireless access point or the WLAN. In some embodiments of the invention, the additional information may have been pre-provisioned by a user of the client device, and/or may have been retrieved by the client device during a previous connection to the wireless access point or WLAN, and stored in the data store. In such embodiments, the further information may be compared to the information stored in the data store, but it should be appreciated that embodiments of the invention are not limited to examining further information by comparison to stored information. Below an example is provided of examining additional information by comparing security settings of a wireless access point or WLAN to stored security settings (e.g., the security settings expected to be implemented by the preferred wireless access point or WLAN). It should be appreciated, however, that embodiments of the invention are not limited to examining security settings as the further information when a mismatch has been detected, and are not limited to performing a comparison of any particular information to supplement a decision when a mismatch has been detected, or to do any further examination of information when a mismatch has been detected.

As an example of such further characteristics, in some embodiments of the invention the process 100 may additionally (or alternatively) compare the security settings of the detected wireless access point and stored security settings, as shown in block 112. Some such embodiments of the invention may be configured with the belief that an attacker would not create a spoofed WLAN (e.g., an attack attempt) in which the security level is equivalent to or higher than the security level of the original network (i.e., the network being spoofed) both for the effort involved in implementing the attack and because the security techniques implemented may interfere with an attempted attack. For example, it may be easy for the attacker to set up a device broadcasting the same SSID as an original network, but if the original network also implements a secure authentication technique it may be more difficult or impossible for the attacker to implement a device which will correctly authenticate a targeted user's computer. Thus, this security technique may interfere with the attack and the attacker may, therefore, not implement any authentication scheme or may implement a less secure authentication scheme to make it easier for the attacker to carry out the attack.

Accordingly, in one embodiment, the process 100 examines security settings for an exact match of security settings between the stored security settings and the detected security settings. If the security settings match, the client device may deem the connection acceptable even if other information (e.g., other characteristics such as the SSID) did not match. If the security settings do not match, the client device may determine that it cannot verify the identity of the wireless access point or WLAN and thus the wireless access point may be a different wireless access point or may be an attempted attack. In response to that determination, any suitable action may be taken, such as preventing an automatic connection and/or providing a notification to the user of the determination.

In an alternative embodiment, the process 100 need not refuse connection based on any mismatch of security settings. Rather, if there is not an identical match, the client device may examine the security settings to determine whether the detected wireless access point is more secure than, equally as secure as, or less secure than the stored security settings. This can be done in any suitable manner. For example, the process 100 may maintain a ranking of types of security which may be implemented by a wireless access point to make the determination of whether a wireless access point is more secure, as secure, or less secure than the stored security level expected for the wireless access point. For example, an illustrative list of known types of security may be sorted with 802.1x security being considered to be more secure than WPA-psk2 [AES], which may be considered to be more secure than WPA-psk. Further, WPA-psk may be considered to be more secure than WEP, which is more secure than no security. It should be appreciated that this list of types of security and the rankings are merely exemplary, and embodiments of the invention may rank any type or types of security in any suitable fashion, or may not rank types of security at all and may make a determination regarding the relative security of a detected wireless access point in any suitable manner. In determining a relative security level of the wireless access point, the client device may implement any suitable technique evaluating any suitable forms of security. For example, the client device may require that the wireless access point provide all forms of security as the expected wireless access point (the wireless access point described by the information in the data store) with individual forms of security being determined to be as secure or more secure. Alternatively, in some embodiments of the invention, a security level may be determined based on a balancing of forms of security, allowing for a wireless access point to be less secure in some ways but more secure in others. For example, a wireless access point having a weaker form of authentication than expected but a stronger form of encryption may be determined to have the same security level as the expected wireless access point.

In one embodiment, based on the principle described above that an attacker will likely not create a spoofed network which is more or as secure as the original network, if a detected wireless access point is determined to be more secure or as secure than expected for the wireless access point (based on the stored security settings), then the process 100 may allow the connection, assuming that the detected wireless access point is the expected wireless access point. However, if a detected wireless access point is less secure than the expected wireless access point (as indicated by the stored security settings), the process 100 may refuse to allow a connection, assuming that the detected wireless access point is a different wireless access point (and thus a wireless access point to which the client device should not automatically connect) and that the reduced security may be an indication of an attack.

As mentioned above, the determination in block 114 may be used in any suitable manner. In one embodiment, the determination is presented to another process being executed by the client device. For example, if the detected wireless access point is determined to be authenticated as the expected wireless access point of the expected WLAN (e.g., the wireless access point characteristics match the stored characteristics for a wireless access point or WLAN), the client device may automatically connect to the detected wireless access point.

If, however, the process 100 determines that the detected wireless access point is not the same wireless access point as the stored wireless access point, the client device may respond in any suitable way. In one embodiment of the invention, the client device may search for a different SSID of another preferred WLAN, or may execute another process to determine a non-preferred WLAN to which to connect (home or otherwise).

Alternatively or additionally, when the process 100 determines that the detected wireless access point is not the same wireless access point as the previously-detected or specified wireless access point using the detected SSID (i.e., the expected wireless access point), the process 100 may present to the user (e.g., via a user interface) an indication that the wireless access point may be a different wireless access point or may be a potential attacker. The indication may be presented to the user in any suitable manner, for example, via a message or icon that may be displayed in association with the wireless access point on a list of nearby wireless access points displayed on the client device, or as any other suitable audible and/or visual indicator. In some embodiments of the invention, if the process 100 determines that the detected wireless access point is a different wireless access point, the client device may still automatically connect to the detected wireless access point, but may apply different configuration parameters to the connection than the configuration parameters that would have been applied if the identity of the wireless access point was verified (i.e., if it was determined that the wireless access point was the expected wireless access point). The different configuration parameters may, in some embodiments, comprise security parameters which are more secure than those that would be applied for the preferred/expected wireless access point, such that the client device is not as susceptible to attack when connected to the detected wireless access point. The different configuration parameters may be any suitable configuration parameters, such as default configuration parameters which may be applied by the client device to connections to WLANs and wireless access points to which the client device has not connected (i.e., default parameters for new networks). The client device may further add the characteristics of the detected wireless access point to its data store for future use in other connections, and may associate with the characteristics any suitable indicator that the detected wireless access point is not a preferred wireless access point or was previously determined to be suspect.

As discussed above, it should be appreciated that embodiments of the invention are not limited to implementing the exemplary process 100 shown in FIG. 1, and that embodiments of the invention which implement a process for confirming the identity of a wireless access point of a wireless network may implement any other suitable technique for confirming the identity of a wireless access point. For example, alternative or additional characteristics of wireless access points, WLANs, and/or connections may be retrieved and compared. As another example, in embodiments of the invention process 100 may be implemented with a block 102 which is monitoring beacon transmissions of wireless access points for characteristics other than an SSID, as any suitable characteristic of a wireless access point or WLAN may be used to identify a preferred WLAN to which the client device should connect.

It should be additionally appreciated that while in some embodiments of the invention, like the illustrative embodiments discussed above, a client device, through process 100, may search for specified WLANs and wireless access points and verify the identity of the wireless access points if found, in some embodiments of the invention, a client device may additionally or alternatively be adapted to gather a list of nearby WLANs and wireless access points and then verify the identity of any of the wireless access points nearby which are specified in the data store and are marked as preferred. Thus, rather than starting the process 100 with a single specified WLAN or SSID for which the client device should search in blocks 102 and 104, a client device may step through a list of nearby, detected WLANs and wireless access points to determine if any of the detected WLANs and wireless access points have been specified in the data store and, if so, whether the identity of those specified can be verified.

Further, it should be appreciated that while process 100 is described in terms of a analyzing information contained in beacon transmissions from wireless access point, embodiments of the invention may retrieve information about the wireless access point in any suitable manner, such as by monitoring probe responses transmitted by wireless access points in response to broadcasts by the client device requesting network characteristics of all wireless access points within range.

It should be further appreciated that while process 100 is described in conjunction with wireless local area networks (WLANs), embodiments of the invention are not limited to operating with WLANs and may implement any suitable process operating with any other suitable type of wired or wireless network, such as Wireless Wide Area Networks (WWANs), Wireless Personal Area Networks (WPANs), or any other wireless network. Such alternative processes may examine any suitable characteristics of WWANs and WPANs and associated access points and/or other devices on the wireless network, such as operator names for a WWAN or device types for a WPAN.

As described above, embodiments of the invention may operate in managed LANs, such as corporate WLANs, rather than or in addition to unmanaged LANS (e.g., home WLANs). Process 200 of FIG. 2 shows such as process for confirming the identity of a managed LAN. It should be appreciated that process 200 is merely exemplary, and that embodiments of the invention operating on managed LANs may implement any suitable process for verifying the identity of a managed LAN. Additionally, it should be appreciated that, as above, a corporate WLAN is merely one illustrative example of a network with which embodiments of the invention may act, as any type or types of wired or wireless network may be used.

The illustrative process 200 begins in block 202, wherein a computing device performs monitoring for a network having a particular GUID. Block 202 may comprise any suitable act of monitoring, including, for example, monitoring for beacon transmissions from wireless access points associated with a network having a specified GUID or one of a list of GUIDs. A GUID for a network may be any suitable unique identifier for the network, such as a forest GUID or domain GUID. A GUID for a network may be determined from a beacon transmitted by a wireless access point of a LAN (if the beacon comprises an indicator of the GUID), may be determined by connecting to the network briefly to retrieve the GUID from a component of the network (e.g., a domain controller of the network), or may be determined in any other suitable manner. As with the specified SSID of block 102 of process 100 (see FIG. 1), the specified GUID may be a GUID of a preferred LAN, such as the corporate LAN at the user's workplace. If it is determined in block 204 that the client device is able to connect to a network having a specified GUID (e.g., the client device is within range of a wireless access point that is part of a preferred LAN), then in block 206 the stored information regarding the network, a component of the network (e.g., a wireless access point), and/or a previous connection to the preferred LAN are retrieved from a data store of information based on the GUID of the detected LAN. The stored information may comprise characteristics which describe an "expected" wireless access point and/or WLAN (i.e., the wireless access point or WLAN that the client device expects to be associated with the GUID).

Alternatively, if it is determined in block 204 that the client device is not able to connect to a network having a specified GUID, then process 200 may loop back to block 202 and continue monitoring for one or more specified networks (e.g., preferred WLANs). In some alternative embodiments of the invention, instead of looping back to block 202, the process 200 may end if no network having a specified GUID is nearby. The client device may then search for non-preferred LANs to which to connect, may present to the user any suitable indication that no preferred LANs were found, or may take any other suitable action.

In block 208, the process 200 may attempt to authenticate the network or the detected wireless access point. Any suitable authentication technique may be implemented by embodiments of the invention, including known conventional authentication techniques including Kerberos and Windows NT LAN Manager (NTLM), or any other technique. Authentication techniques typically allow for a client device and a service provider (e.g., a wireless access point) to prove the identity of each to the other based on information provided by a trusted third party such as an authentication server, though embodiments of the invention may implement techniques operating according to any suitable authentication protocol. As exemplary techniques which may be implemented by embodiments of the invention are known in the art, authentication techniques will not be discussed further herein, though it should be appreciated that embodiments of the invention may implement any suitable technique.

In block 210, the success of the authentication attempt of block 208 is compared to the authentication success stored in the data store in association with the GUID. Then, in block 212, a determination is made as to whether the detected wireless access point is the expected wireless access point. The comparison of block 212 may be performed in any suitable manner. For example, the characteristics of the detected network may be compared to the characteristics of the expected network stored in the data store (e.g., whether or not authentication was successful). In one embodiment, the GUIDs of the detected wireless access point and the preferred wireless access point may be compared to determine whether the GUIDs match. If the GUIDs match, then the detected wireless access point may determined to be the expected wireless access point. If the GUIDs do not match, then the process 200 may determine that it cannot verify the identity of the detected wireless access point and thus that the detected wireless access point may be a different wireless access point than the expected wireless access point.

If the GUIDs match, or not, in some embodiments of the invention the process 200 may compare success in authentication prior to making a final determination as to whether the detected network is the expected network (i.e., may examine a result of the comparison of block 210). This comparison may be performed in any suitable manner. For example, if authentication was successful in the past (according to the information stored in the data store) and authentication was successful in block 208, then the detected network may be determined in block 212 to be the expected network (e.g., the wireless access point of a preferred corporate WLAN, and the wireless access point which is described by the characteristics stored in the data store). If authentication was not successful in the past and was not successful in block 208, then the process 200 may determine that the detected network is the expected network, based on the similarity between the detected characteristics and the stored characteristics. If authentication was successful in the past and was not successful in block 208, then the process 200 may determine that the detected network may be a different network (i.e., that it cannot verify the identity of the detected wireless access point) and/or may determine that the detected network may be a potential attacker. Finally, if authentication was not successful in the past and was successful in block 208, then the detected network may be determined to be the preferred network because, as discussed above in conjunction with process 100 of FIG. 1, attackers do not typically set up hoax networks which are more secure than the networks they seek to mimic.

The determination of process 200 may be provided to the client device and used in any suitable manner. For example, if the detected network is determined to be the preferred network, then the client device may automatically connect to the detected network without intervention from the user. If, however, the process 100 determines that it cannot verify the identity of the detected network, then the client device may determine that the detected network is not the same network as the stored network (i.e., the network described by the stored information/characteristics). If so, the client device may take any suitable action, such as re-initiating process 200 with a different GUID of another preferred LAN, executing another process to determine a non-preferred LAN to which to connect (managed or otherwise), or taking any other suitable action.

Alternatively or additionally, if the process 200 determines that the detected network may be a different network than the expected network, the process 200 may present to the user (e.g., via a user interface) an indication that the detected network may be a different network and/or may be a potential attacker. The indication may be presented to the user in any suitable manner, such as any message or icon indicating to the user the determination regarding the network that may be displayed in association with the wireless access point on a list of nearby networks displayed on the client device, or as any other suitable audible and/or visual indication.

In some embodiments of the invention, if the process 200 determines that the detected network may be a different network than the expected network (e.g., the process 200 determines that it cannot verify the identity of the network), the client device may still automatically connect to the detected network, but may apply different configuration parameters to the connection than the configuration parameters that would have been applied if the identity of the network was verified (i.e., if it was determined that the network was the expected wireless access point). The different configuration parameters may, in some embodiments, comprise security parameters which are more secure than those that would be applied for the preferred/expected network, such that the client device is not as susceptible to attack when connected to the detected network. The different configuration parameters may be any suitable configuration parameters, such as default configuration parameters which may be applied by the client device to connections to LANs and networks to which the client device has not connected (i.e., default parameters for new networks).

The client device may also, in some embodiments of the invention, add the characteristics of the detected network to its data store for future use in other connections, and may associate with the characteristics any suitable indication that the detected network may not be a preferred network and/or was previously determined to be suspect.

As discussed above, it should be appreciated that embodiments of the invention are not limited to implementing the exemplary process 200 shown in FIG. 2, and that embodiments of the invention which implement a process for confirming the identity of a network (e.g., a managed LAN such as a corporate WLAN) may implement any other suitable technique for confirming the identity of a wireless access point. For example, alternative or additional characteristics of network components (e.g., wireless access points), WLANs, and/or connections may be retrieved and compared. Further, if the stored characteristics of the preferred LAN indicate that authentication was not successful before, then the process 200 may not attempt authentication in block 208 and may instead determine that the detected network is the preferred network or may perform any other suitable comparison to confirm the identity of the detected network.

In addition, while some of the examples described above are discussed in conjunction with wireless networks, embodiments of the invention may be configured to operate on wired networks rather than wireless networks. For example, some embodiments of the invention, such as those operating on wired networks, may be configured to retrieve the GUID from a network component in the network after connecting to the network, rather than from a beacon transmission transmitted by a wireless access point. In some embodiments of the invention, the client device may be configured to authenticate a domain controller or other component in the network, rather than a wireless access point. Embodiments of the invention may comprise client devices configured in any suitable manner to operate on any suitable wired and/or wireless network(s).

In addition, in some embodiments of the invention, a universal process may be implemented for confirming the identity of a corporate LAN independent of the type of LAN (e.g., whether it is wireless or wired). In some such universal processes, a client device may be configured to interact with network components (e.g., request/retrieve GUID(s), authenticate, or perform any other action) which may be found in both wired and wireless networks, or may be configured to select components with which to interact based on a detection of the type of corporate LAN (wireless or wired) to which it is connected. By communicating with network components which may be found in a network regardless of the type of network, then the process may be more adaptable to function with any suitable type of network and may therefore be more universal.

As another example, in embodiments of the invention process 200 may be implemented with a block 202 which is monitoring beacon transmissions of wireless access points for characteristics other than a GUID, as any suitable characteristic of a network component (e.g., wireless access point) or LAN may be used to identify a preferred LAN to which the client device should connect.

Additionally, in some embodiments of the invention, in addition to comparing the success of the authentication of block 208, the type of authentication used may be compared in block 210. As discussed above in conjunction with process 100 of FIG. 1, security types in home WLANs may be ranked according to their relative degree of security. The same may be true of authentication types in corporate WLANs. For example, a comparison may be made to determine if the type of authentication implemented is stronger or weaker than the type of authentication previously used, as indicated by the stored characteristics. An exemplary ranking of authentication types ranks mutual authentication algorithms as stronger than unidirectional authentication algorithms, and ranks unidirectional authentication algorithms as stronger than no authentication. It should be appreciated that this ranking and categorization is merely exemplary, and embodiments of the invention which compare types of authentication implemented by embodiments of the invention are not limited to implementing this illustrative ranking or categorization. The determination of block 212 may then be made based at least in part on the type of authentication and any changes in the authentication. For example, as discussed above in conjunction with security settings in process 100 of FIG. 1, if the authentication type is as strong or stronger than the type of authentication indicated in the stored characteristics, then the detected wireless access point may be considered to be the preferred wireless access point, while if the authentication type is weaker the detected wireless access point may be flagged as a new or different wireless access point and may additionally be flagged as a potential attack.

Further, as discussed above in conjunction with process 100 of FIG. 1, it should be appreciated that while process 200 is described in terms of a analyzing information contained in beacon transmissions from wireless access point, embodiments of the invention may instead monitor probe responses transmitted by wireless access points in response to broadcasts by the client device requesting network characteristics of all wireless access points within range.

It should be further appreciated that while process 200 is described in conjunction with wireless local area networks (WLANs), embodiments of the invention are not limited to operating with WLANs and may implement any suitable process operating with any other suitable type of wireless network, such as Wireless Wide Area Networks (WWANs), Wireless Personal Area Networks (WPANs), or any other wireless network. Such alternative processes may examine any suitable characteristics of WWANs and WPANs and associated access points and/or other hardware on the wireless network, such as operator names for a WWAN or device types for a WPAN.

FIGS. 1 and 2 have been described above in conjunction with a process for searching for a preferred home WLAN to which to connect and a preferred corporate WLAN to which to connect, respectively. In some embodiments of the invention, rather than two separate processes for searching for a wireless network matching specified characteristics, a single process may be implemented for examining wireless access points within range to determine whether they are preferred wireless access points.

Figure 3:
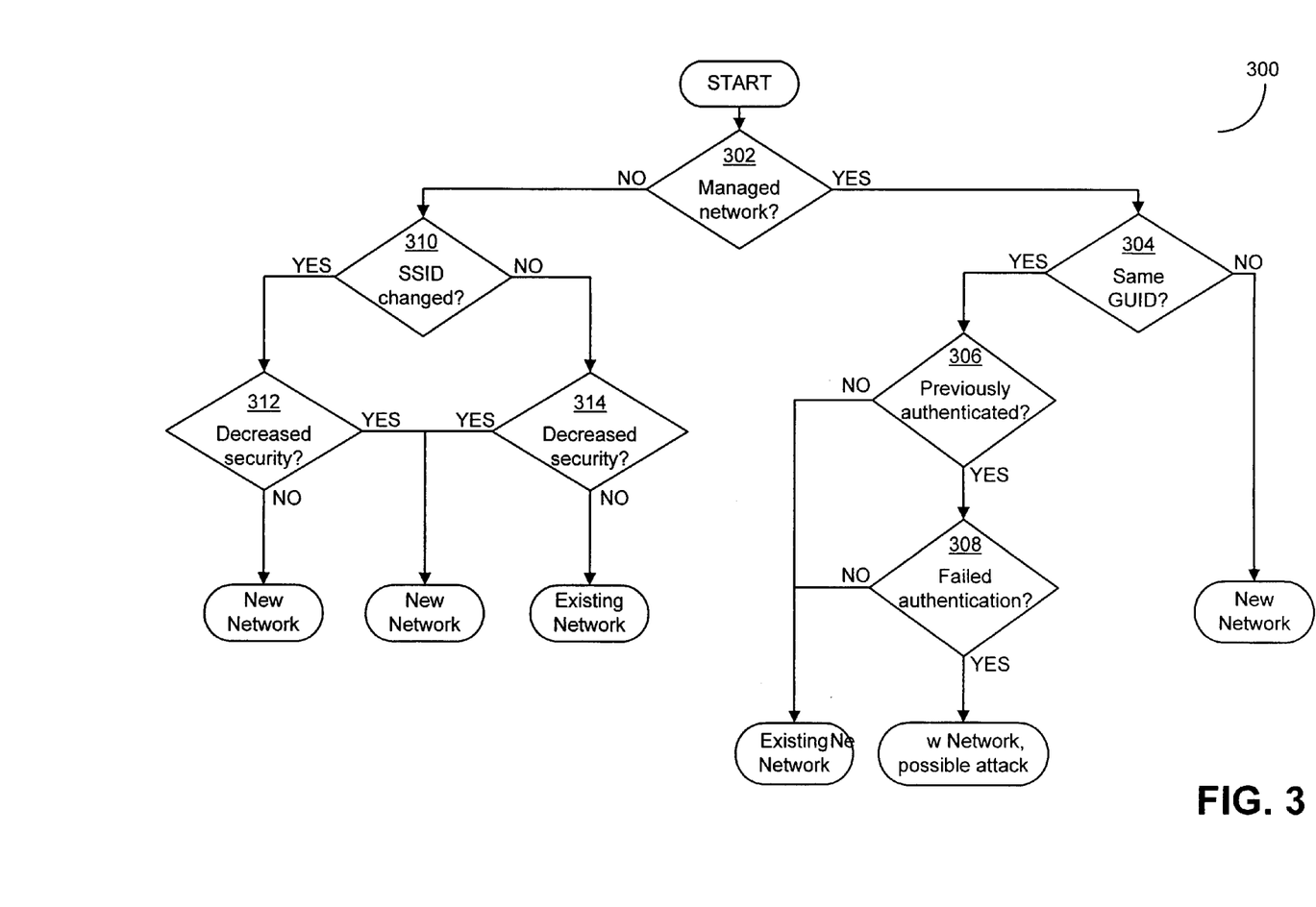
FIG. 3 is a flowchart of an illustrative process of identifying a wireless access point which may be implemented in accordance with one embodiment of the invention.

An exemplary process for searching for verifying the identity of a network of any type is shown in process 300 of FIG. 3. It should be appreciated that embodiments of the invention are not limited to implementing a single process for verifying the identity of a network, nor are embodiments of the invention which implement such a process limited to implementing the illustrative process 300 of FIG. 3, as any other suitable technique may be employed.

Additionally, it should be appreciated that while process 300 is described below with reference to WLANs, processes such as process 300 may be implemented with any suitable type or types of networks, such as wired or wireless networks, or managed or unmanaged networks (e.g., home or corporate WLANs).

Process 300 begins in block 302, wherein a network to which a client device may connected is examined to determine if the network is a managed network. This determination may be made by, for example, examining the network to determine if it a domain controller, AAA server, or other network management component is connected to the network, by examining a beacon transmission to determine if it contains a GUID for a managed network, or by any other suitable technique. If the network is a managed network, then in block 304 a GUID for the network is retrieved in any suitable manner—such as by retrieving the GUID from a network component such as a domain controller—and is compared to known GUIDs in a data store of network information (e.g., information on WLANs) to determine if the detected network is a known network (e.g., a preferred network). The data store of information regarding networks—including, for example, WLANs and wireless access points—may be established in any suitable manner, such as the exemplary techniques discussed above in conjunction with processes 100 of FIG. 1 and 200 of FIG. 2, or in any other manner.

If it is determined in block 304 that the GUID is not a GUID of a preferred network then the process 300 may determine that it cannot verify the identity of the network, and, in some embodiments, the detected network may be flagged as a new or different network than that in the data store. If, however, the GUID detected is determined in block 304 to be associated with a preferred network, then in block 306 the stored information regarding the preferred network associated with the GUID are examined to determine if the client device authenticated with the preferred network when it connected previously. If it is determined in block 306 that the client device did not previously authenticate, then, in some embodiments of the invention, the detected wireless access point may be determined to be the preferred network, as in some embodiments of the invention the only information stored for a managed network is a GUID and an indication of authentication success. In other embodiments not pictured, however, a process may evaluate any suitable additional information to determine whether the detected network is a preferred network, according to whatever information it has available in the data store to make that determination.

If, however, it is determined in block 306 that the client device did previously authenticate with the expected LAN, then in block 308 the process 300 attempts to authenticate the client device with the detected network and it is determined whether the authentication is successful. If it is determined in block 308 that the authentication is successful, then the detected network may be determined to be the expected network (i.e., a wireless access point described in the data store which may be a preferred wireless access point). If, however, it is determined in block 308 that the authentication process did not succeed, then the process determines that the detected network may be part of a new network or a network different from the preferred network. Additionally, if it is determined in block 308 that the client device has failed authentication whereas it previously succeeded in authenticating (as indicated by the stored characteristics of the LAN), then the process may determine, in some embodiments of the invention, that the detected network may be a potential attacker.

If in block 302 the detected wireless access point was not determined to be a managed network, then the Gateway MAC of the detected network is used to retrieve characteristics of the detected network from the data store of information regarding network components (e.g., wireless access points), WLANs, and previous connections. If the Gateway MAC is in the data store and associated with characteristics, then the SSID of the detected wireless access is compared to the SSID associated with the Gateway MAC in the data store. In block 310 it is determined whether the SSID is the same as the SSID of the expected wireless access point (i.e., the SSID associated with the Gateway MAC in the data store). If it is determined that the SSID is not the same (i.e., that it has changed) then the security settings of the detected wireless access point are compared to the security settings stored in the data store and it is determined in block 312 whether the security of the detected wireless access point has been decreased from the security indicated in the data store.

A comparison of security levels may be done in any suitable manner, such as the techniques described above in conjunction with process 100 of FIG. 1. For example, the process 300 may determine whether the security has changed, and/or may maintain a ranking of types of security and may determine whether the type of security implemented by the detected wireless access point is stronger or weaker (i.e., higher security or lower security) than the security indicated by the data store. Even if the security is the same or higher, then the process 300 may still determine that it cannot verify the identity of the wireless access point or WLAN because of the change in SSID, and the WLAN may, in some embodiments, take other actions, such as flagging the detected network as a new network or a network different from the expected network, or any other suitable action. Additionally, if in block 312 it is determined that the security of the detected wireless access point has decreased from the security indicated by the data store, then the process 300 may determine that it cannot verify the identity of the network, and may flag the wireless access point as a new or different network than the expected network, or take any other suitable action.

If in block 310 it is determined that the SSID of the detected wireless access point is the same SSID indicated in the data store, then the process 300 may further confirm the identity of the detected wireless access point by comparing the security of the detected wireless access point to the security indicated by the data store. This may be done in any suitable manner, as described in conjunction with block 312 and process 100 of FIG. 1. If it is determined in block 314 that the security level has decreased, then the process 300 may determine that it cannot verify the identity of the detected network due to this disparity, and may, in some embodiments, flag the detected network as a new network or as a network different from the expected network, or take any other suitable action. If, however, it is determined in block 314 that the security level has not changed (or has risen) then the detected wireless access point may be considered to be the existing wireless access point which is described by the characteristics of the data store (i.e., the process 300 may verify the identity of the network).

The determination of process 300 (whether the identity of the detected wireless access point can be verified, and/or whether the detected network is a new network, an existing/preferred network, or a potential attack) may be presented to another process of the client device and may be used in any suitable manner. For example, if it is determined that a detected wireless access point is an existing wireless access point and is a preferred wireless access point, then the client device may automatically connect to the detected wireless access point. If the identity of the detected wireless access point cannot be verified (i.e., the detected network is determined to be a new or different wireless access point), such a determination may be presented to a user in any suitable fashion, such as, in a user interface on the client device displaying a list available wireless access points to a user, placing an indicator next to a listing for the detected wireless access point which signifies to the user that the detected wireless access point is part of a WLAN to which the user has not previously connected. If a detected wireless access point is also determined to be a potential attacker, then the user interface may further display to the user an indicator that the detected wireless access point may be a threat.

Additionally, if the user chooses to connect to a wireless access point that has been determined by the process 300 to be a new or different wireless access point then the client device may be configured to apply different configuration parameters to the connection than the configuration parameters that would have been applied if the identity of the wireless access point had been verified (i.e., if it was determined that the wireless access point was the expected wireless access point).

The different configuration parameters may, in some embodiments, comprise security parameters which are more secure than those that would be applied for the preferred/expected wireless access point, such that the client device is not as susceptible to attack when connected to the detected wireless access point. The different configuration parameters may be any suitable configuration parameters, such as default configuration parameters which may be applied by the client device to connections to WLANs and wireless access points to which the client device has not connected (i.e., default parameters for new networks).

It should be appreciated that embodiments of the invention are not limited to implementing the exemplary process 300 shown in FIG. 3, and that embodiments of the invention which implement a single process for confirming the identity of a wireless access point of a wireless network may implement any other suitable technique for confirming the identity of a wireless access point. For example, alternative or additional characteristics of wireless access points, WLANs, and/or connections may be retrieved and compared as part of a process.

Further, it should be appreciated that while process 300 is described in terms of a analyzing information contained in beacon transmissions from wireless access point, embodiments of the invention may instead monitor probe responses transmitted by wireless access points in response to broadcasts by the client device requesting network characteristics of all wireless access points within range.

It should be further appreciated that while some examples of embodiments of process 300 are described in conjunction with wireless local area networks (WLANs), embodiments of the invention are not limited to operating with WLANs and may implement any suitable process operating with any other suitable type of wireless network, such as Wireless Wide Area Networks (WWANs), Wireless Personal Area Networks (WPANs), wired networks, or any other suitable type of computer network. Such alternative processes may examine any suitable characteristics of WWANs and WPANs and associated access points and/or other hardware on the wireless network, such as operator names for a WWAN or device types for a WPAN.

Figure 4:
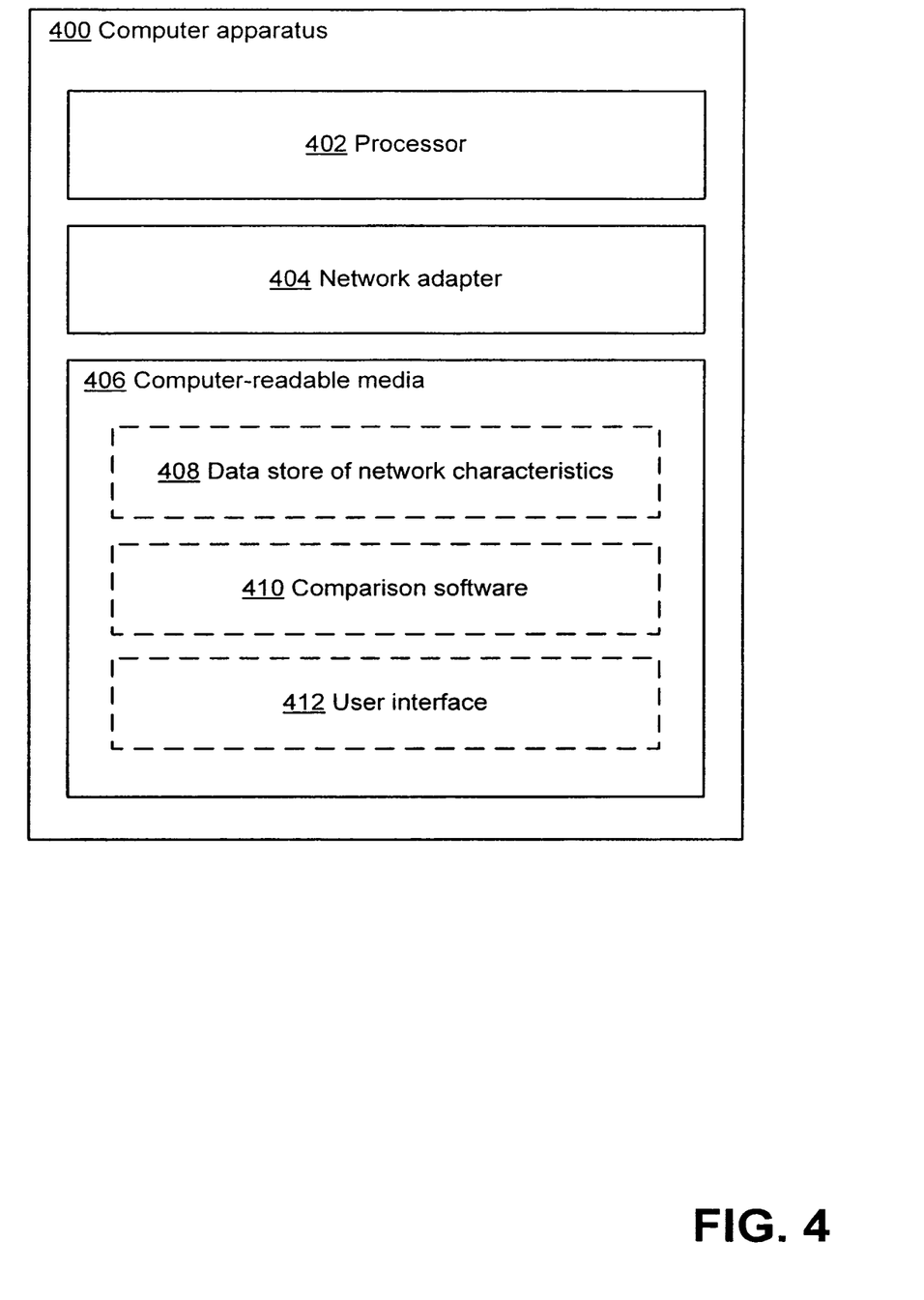
FIG. 4 is a schematic of an exemplary client device on which embodiments of the invention may be implemented.

As discussed above, processes such as the exemplary processes 100, 200, and 300 of FIGS. 1, 2, and 3, respectively, may be implemented on any suitable client device. FIG. 4 shows a computer apparatus 400 which may be used as a client device in accordance with one or more embodiments of the invention. It should be appreciated that FIG. 4 is intended to be neither a depiction of necessary components for a computing device to operate as a computer apparatus with embodiments of the invention, nor a comprehensive depiction.

Computer apparatus 400 may be a client device adapted to communicate over a computer network and for use by a user, such as a desktop personal computer, a laptop personal computer, a server, a personal digital assistant (PDA), a smart/mobile telephone, or any other suitable electronic device. As shown in FIG. 4, computer apparatus 400 comprises a processor 402, a network adapter 404, and computer-readable media 406. Network adapter 404 may be any suitable hardware and/or software to enable computer apparatus 400 to communicate with any other suitable computing device over any suitable computing network. The computing network may be any suitable wired and/or wireless communication medium or media for exchanging data between two or more computers, including WLANs, WWANs, WPANs, and the Internet. Network adapter 404 may be adapted to retrieve characteristics of wireless access points from beacon transmissions and/or broadcast a request for characteristics of all wireless access points within range of the computer apparatus 400. Computer-readable media 406 may be adapted to store data to be processed and/or instructions to be executed by processor 402. Processor 402 enables processing of data and execution of instructions. The data and instructions may be stored on the computer-readable media 406 and may, for example, enable communication between components of the computer apparatus 400.

In accordance with some embodiments of the invention, the data and instructions stored on computer-readable media 706 may comprise a data store of network characteristics 408. The data store of network characteristics 408 may comprise any suitable characteristic or characteristics of network components (e.g., wireless access points), networks, and/or previous connections to networks. The data store 408 may be stored in any suitable manner, and may be, for example, grouped by Gateway MAC for unmanaged LANs and forest GUID for managed LANs. It should be appreciated that any characteristics of any suitable type or types of networks, such as LANs, WLANs, WWANs, and WPANs. The computer-readable media 406 may further comprise comparison software 410 for comparing characteristics of detected wireless access points, which may be provided by network adapter 404, to characteristics of wireless access points stored in the data store of network characteristics 408. Computer-readable media 406 may further comprise a user interface 410. The user interface 410 may be encoded on the computer-readable media 406 in, for example, the form of instructions for generating a user interface 410. The user interface 410 may be any suitable user interface which allows a user to interact with the computer apparatus 400 to specify preferred networks, view a list of wireless access points within range, and/or select a network to which to connect.

Figure 5A:
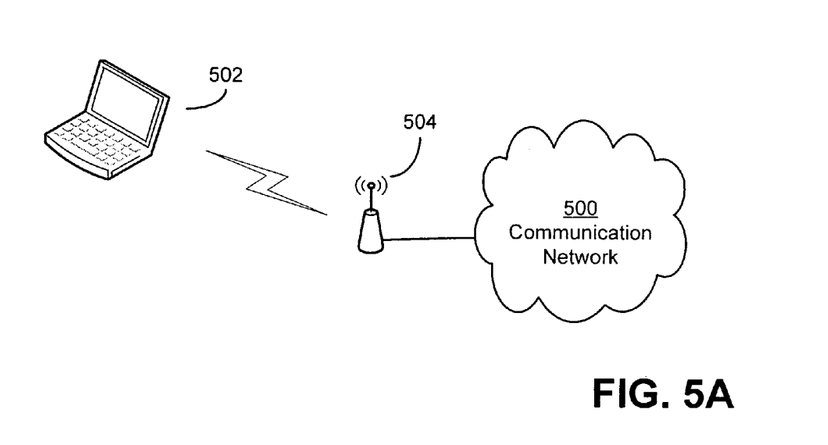
FIGS. 5A and 5B are diagrams of exemplary computer systems in which embodiments of the invention may act.
Figure 5B:
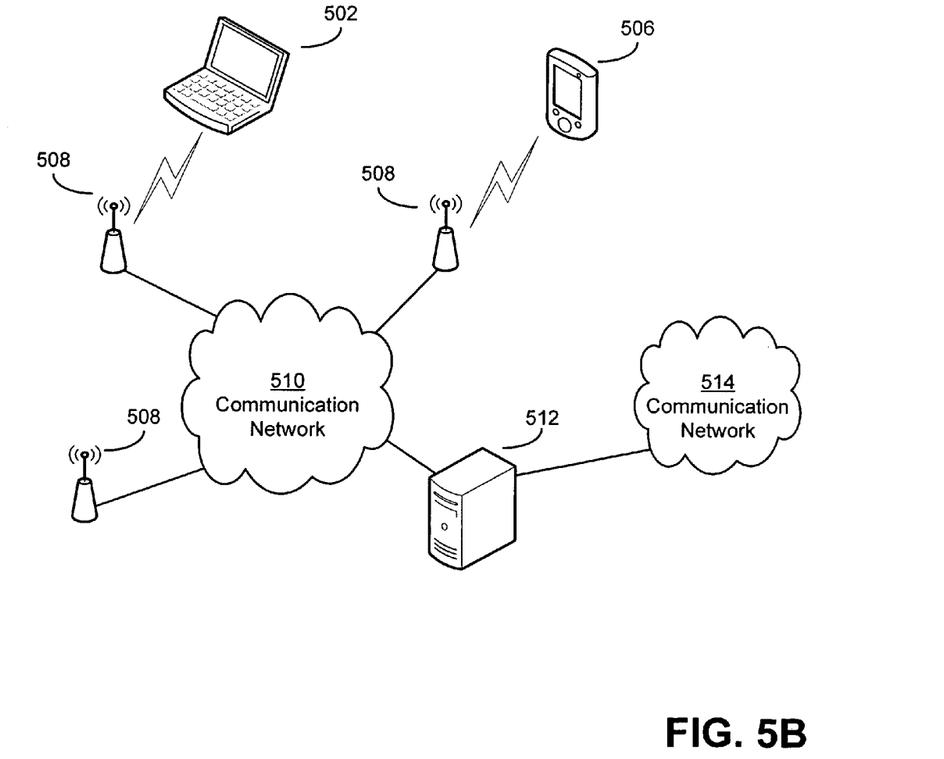

The aspects of the present invention described herein may be implemented on any of numerous computer system configurations and are not limited to any particular type of configuration. FIGS. 5A and 5B show various computer systems in which embodiments of the invention may act, though others are possible.

For example, in the exemplary computer system of FIG. 5A, a client device 502 is shown in wireless communication with a wireless access point 504. The wireless access point 504 may be connected to a communication network 500, which may comprise any suitable wired and/or wireless communication medium or media for exchanging information between two or more computers. The computer system of FIG. 5A may be, for example, an unmanaged WLAN, wherein the wireless access point 504 acts as both an access point and a gateway.

FIG. 5B shows a second exemplary computer system, in which multiple wireless access points 508 are connected to a communication network 510, and to which client devices 502 and 506 are in wireless communication. The communication network 510 is then connected to another communication network 514 through a gateway server 512. Communication networks 510 and 514 may comprise any suitable wired and/or wireless communication medium or media for exchanging information between two or more computers. In some embodiments of the invention, communication network 510 may be implemented as an enterprise network and communication network 514 may be implemented as the Internet. The computer system of FIG. 5B may be, for example, a managed WLAN or a WWAN.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

In addition to the functionality described above, it should be appreciated that a computer apparatus may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer apparatus may receive input information through speech recognition or in other audible format.

Computer apparatuses may be interconnected by one or more communication networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method for verifying authenticity of a network access point that identifies itself to a client computing device via an identifier, the method comprising:
    comparing at least one additional characteristic of network access point that identifies itself using the identifier to stored information that identifies at least one expected value for a corresponding characteristic of an authenticated network access point also identified by the identifier, wherein comparing the at least one additional characteristic of the network access point to the stored information that identifies the at least one expected value comprises determining whether at least one current security setting in use by the network access point reflects at least one expected security setting for the authenticated network access point, wherein the network access point provides access to a managed wireless network, the identifier for the network access point comprises a globally unique identifier (GUID) for the managed wireless network, and the at least one additional characteristic of the network access point comprises a result of an authentication attempt for the managed wireless network; and
    connecting, by the client computing device, to the network access point in response to the at least one additional characteristic of the network access point matching the stored information that identifies the at least one expected value.

2. The method of claim 1, further comprising:
    verifying authenticity of another network access point, the other network access point providing access to an unmanaged wireless network based on a Service Set Identifier (SSID) for the unmanaged wireless network, and based on a media access control (MAC) address of a gateway associated with the other network access point.

3. The method of claim 1, further comprising:
disallowing connection of the client computing device to the wireless access point in response to the at least one additional characteristic of the network access point not reflecting the stored information that identifies the at least one expected value for the corresponding characteristic of the authenticated network access point also identified by the identifier.

4. The method of claim 1, further comprising:
in response to the at least one additional characteristic of the network access point not reflecting the stored information that identifies the at least one expected value for the corresponding characteristic of the authenticated network access point also identified by the identifier:
establishing a connection to the network access point; and
configuring the connection to be more secure than a connection that would have been established had the at least one additional characteristic of the network access point reflected the stored information that identifies the at least one expected value for the corresponding characteristic of the authenticated network access point also identified by the identifier.

5. The method of claim 4, wherein configuring the connection to be more secure comprises disallowing connections to one or more ports of the client computing device.

6. The method of claim 1, further comprising:
in response to the at least one additional characteristic of the network access point not reflecting the stored information that identifies the expected value for the corresponding characteristic of the authenticated network access point also identified by the identifier:
displaying an indication that the network access point is not verified.

7. The method of claim 1, wherein:
determining whether the at least one current security setting reflects the at least one expected security setting includes:
determining whether the network access point using the at least one current security setting is more secure than the authenticated network access point having the at least one expected security setting;
determining that the at least one current security setting reflects the at least one expected security setting if the network access point using the at least one current security setting is at least as secure as the authenticated network access point.

8. The method of claim 1, further comprising:
authenticating the client computing device to the network access point by providing information proving the identity of the client computing device to the network access point.

9. The method of claim 1, further comprising:
in response to the at least one additional characteristic of the network access point not reflecting the stored information that identifies the expected value for the corresponding characteristic of the authenticated network access point also identified by the identifier:
storing information regarding the network access point.

10. An apparatus for verifying authenticity of a network access point, the apparatus comprising:
at least one memory; and
at least one hardware processor, wherein the at least one memory and the at least one hardware processor respectively store and execute instructions that:
compare at least one characteristic of the network access point, other than an identifier used by the network access point, to stored information that identifies at least one expected value for a corresponding characteristic of an authenticated network access point that also uses the identifier, wherein the comparison of the at least one characteristic of the network access point to the stored information that identifies the at least one expected value includes a determination of whether at least one current security setting in use by the network access point matches at least one expected security setting for the authenticated network access point, wherein the network access point provides access to a managed wireless network, the identifier comprises a globally unique identifier (GUID) for the managed wireless network, and the at least one characteristic of the network access point comprises a result of an authentication attempt for the managed wireless network; and
establish a connection with the network access point if the at least one characteristic of the network access point matches the stored information that identifies the at least one expected value.

11. The apparatus of claim 10, wherein the instructions also:
a warning if the at least one characteristic of the network access point does not match the stored information that identifies the expected value for the corresponding characteristic of the authenticated network access point.

12. The apparatus of claim 10, wherein the instructions also:
in response to the at least one characteristic of the network access point not matching the stored information that identifies the at least one expected value:
establish a connection to the network access point; and
configure the connection to be more secure than a connection that would have been established had the at least one characteristics of the network access point matched the stored information.

13. The apparatus of claim 12, wherein configuration of the connection to be more secure includes blocking connections to one or more ports of the apparatus.

14. A computer-readable memory having instructions stored therein for performing operations that verify authenticity of a network access point that identifies itself to a client computing device via an identifier, the operations comprising:
comparing at least one characteristic of the network access point, other than the identifier, to at least one stored expected value of a corresponding characteristic of an authenticated network access point also identified by the identifier, wherein comparing the at least one characteristic of the network access point to the at least one stored expected value comprises determining whether at least one current security setting in use by the network access point reflects at least one expected security setting for the authenticated network access point, wherein the network access point provides access to a managed wireless network, the identifier for the network access point comprises a globally unique identifier (GUID) for the managed wireless network, and the at least one characteristic of the network access point comprises a result of an authentication attempt for the managed wireless network; and
connecting, by the client computing device, to the network access point in response to the at least one characteristic of the network access point reflecting the at least one stored expected value.

15. The computer-readable memory of claim 14, further comprising:
 verifying authenticity of another network access point, the other network access point providing access to an unmanaged wireless network based on a Service Set Identifier (SSID) for the unmanaged wireless network, and based on a media access control (MAC) address of a gateway associated with the other network access point.

16. The computer-readable memory of claim 14, further comprising:
 disallowing connection of the client computing device to the wireless access point in response to the at least one characteristic of the network access point not reflecting the at least one stored expected value for the corresponding characteristic of the authenticated network access point also identified by the identifier.

17. The computer-readable memory of claim 14, further comprising:
 in response to the at least one characteristic of the network access point not reflecting the at least one stored expected value for the corresponding characteristic of the authenticated network access point also identified by the identifier:
  establishing a connection to the network access point; and
  configuring the connection to be more secure than a connection that would have been established had the at least one characteristic of the network access point reflected the at least one stored expected value for the corresponding characteristic of the authenticated network access point also identified by the identifier.

18. The computer-readable memory of claim 17, wherein configuring the connection to be more secure comprises disallowing connections to one or more ports of the client computing device.

19. The computer-readable memory of claim 14, further comprising:
 in response to the at least one characteristic of the network access point not reflecting the at least one stored expected value for the corresponding characteristic of the authenticated network access point also identified by the identifier:
  displaying an indication that the identity of the network access point is not verified.

20. The computer-readable memory of claim 14, further comprising:
 in response to the at least one characteristic of the network access point not reflecting the at least one stored expected value for the corresponding characteristic of the authenticated network access point also identified by the identifier:
  storing information regarding the network access point.

* * * * *